United States Patent [19]

Hannan

[11] 4,090,722
[45] May 23, 1978

[54] APPARATUS FOR REMOVAL OF CONTAINER CARRIERS

[75] Inventor: Garnet Marshall Underwood Hannan, Jerilderie, Australia

[73] Assignee: G. Hannan & Sons Nominees Proprietary, Limited, Australia

[21] Appl. No.: 698,593

[22] Filed: Jun. 22, 1976

[51] Int. Cl.² ............................................. B62B 11/00
[52] U.S. Cl. .................................... 280/47.32; 214/58
[58] Field of Search ............... 214/38 CB, 38 BB, 58, 214/44 R, 515; 296/35 A; 280/47.32

[56] References Cited

U.S. PATENT DOCUMENTS

| | | | |
|---|---|---|---|
| 1,422,663 | 7/1922 | Callison | 214/38 CB |
| 1,835,133 | 12/1931 | Bergen, Jr. | 296/35 A X |
| 2,720,324 | 10/1955 | Cosentino | 214/38 CB |
| 2,936,912 | 5/1960 | Black | 214/38 CB |
| 3,023,918 | 3/1962 | Penman | 214/38 CB |
| 3,231,121 | 1/1966 | Powell | 214/515 |
| 3,473,819 | 10/1969 | Tantlinger et al. | 280/43.32 |
| 3,593,387 | 7/1971 | Georgi | 296/35 A X |

FOREIGN PATENT DOCUMENTS

| | | | |
|---|---|---|---|
| 496,314 | 7/1954 | Italy | 214/38 BB |
| 1,336,731 | 11/1973 | United Kingdom. | |

Primary Examiner—Albert J. Makay
Attorney, Agent, or Firm—Murray & Whisenhunt

[57] ABSTRACT

The invention provides method and apparatus for removal of container carriers from trucks or like transportation means using wheel means mounted to the container carriers.

6 Claims, 10 Drawing Figures

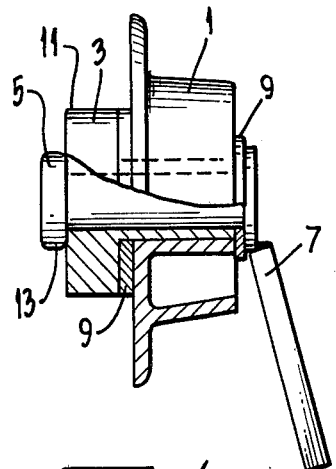
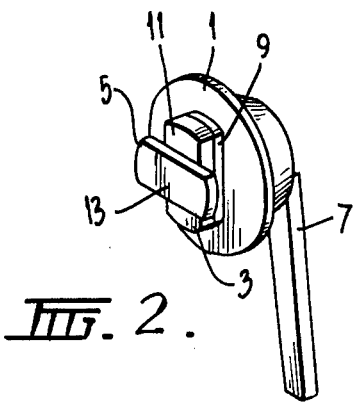
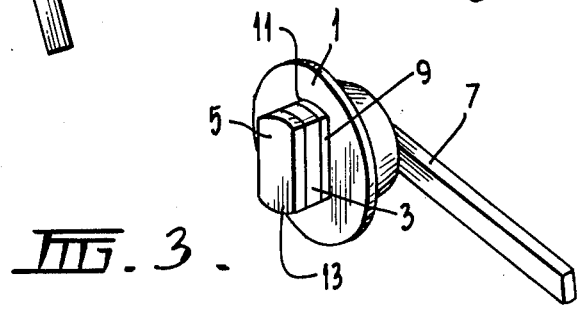
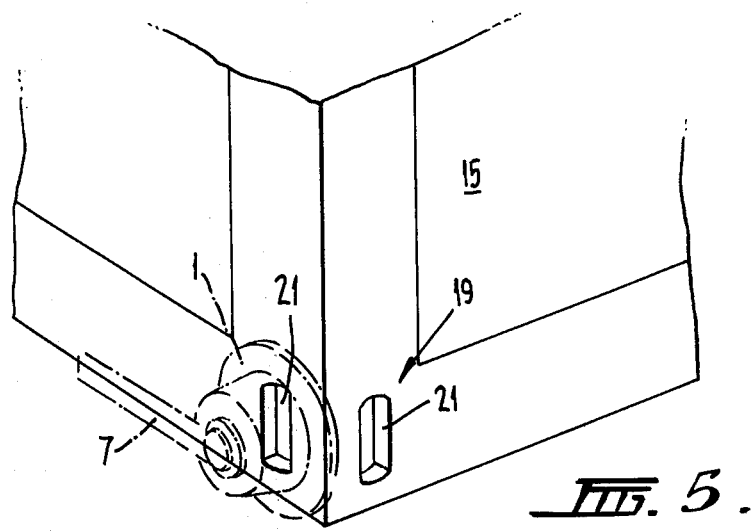

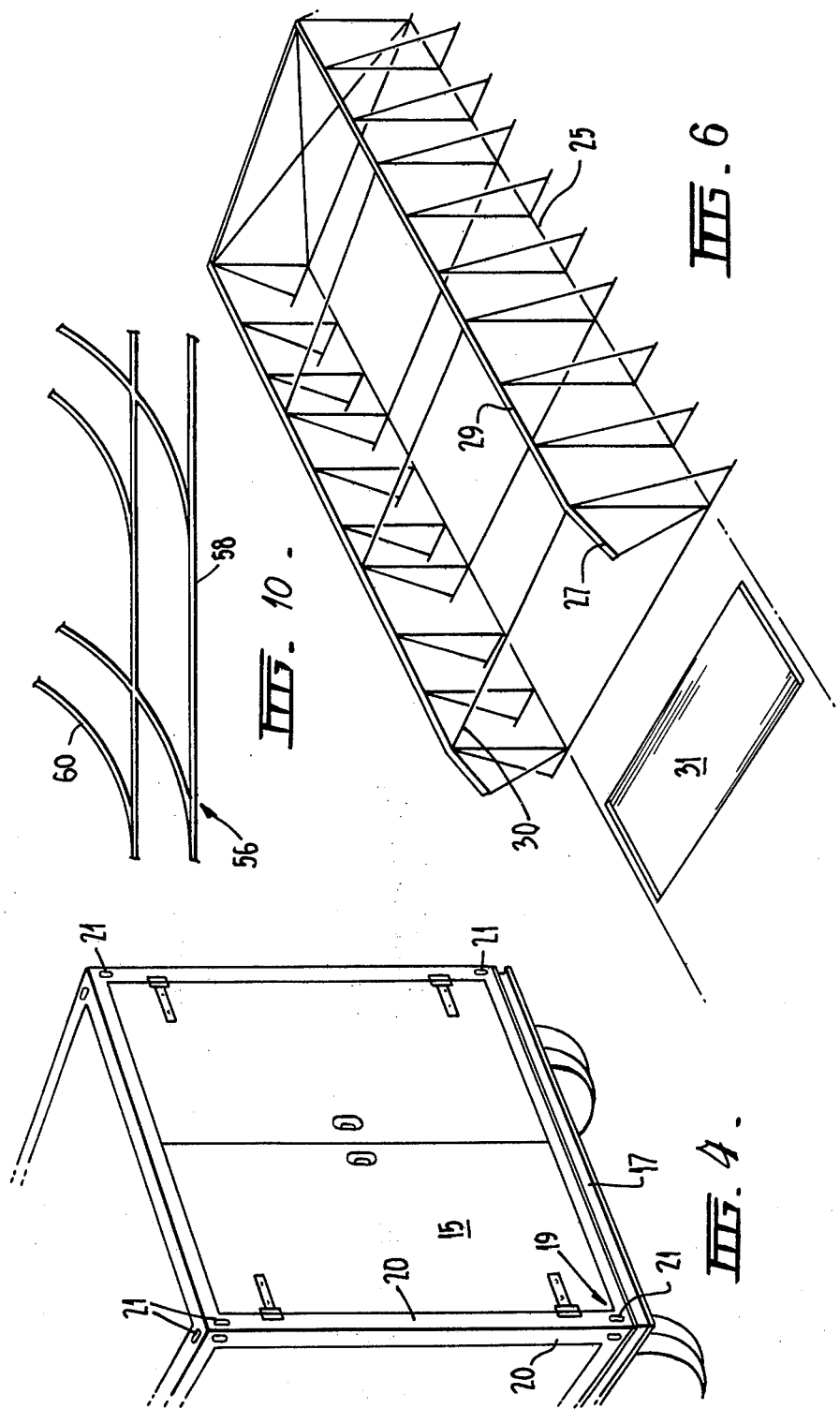

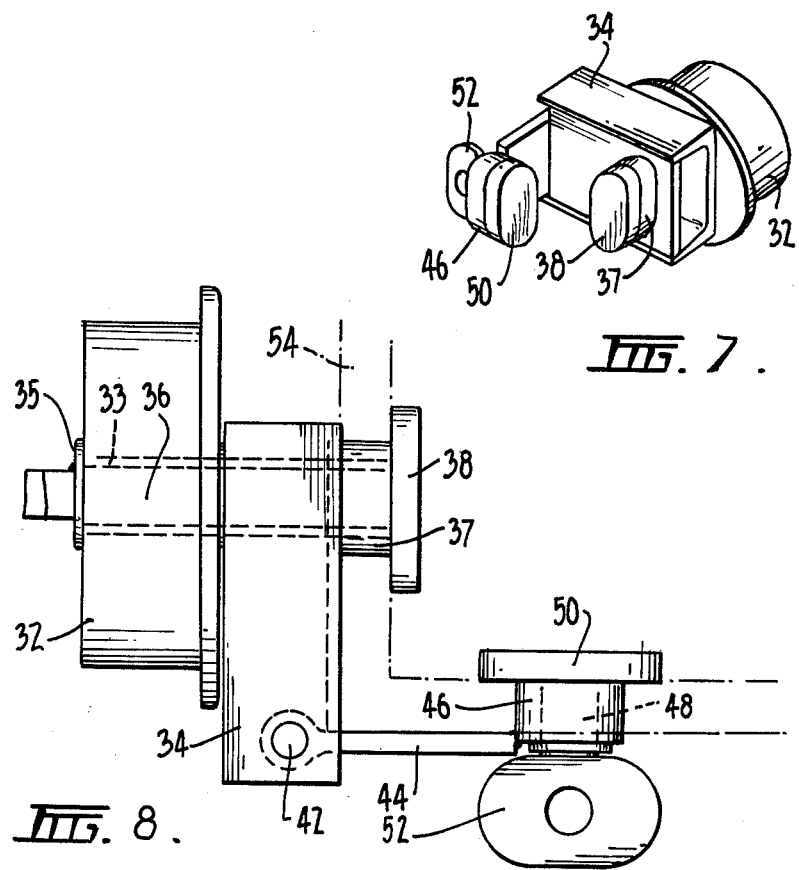
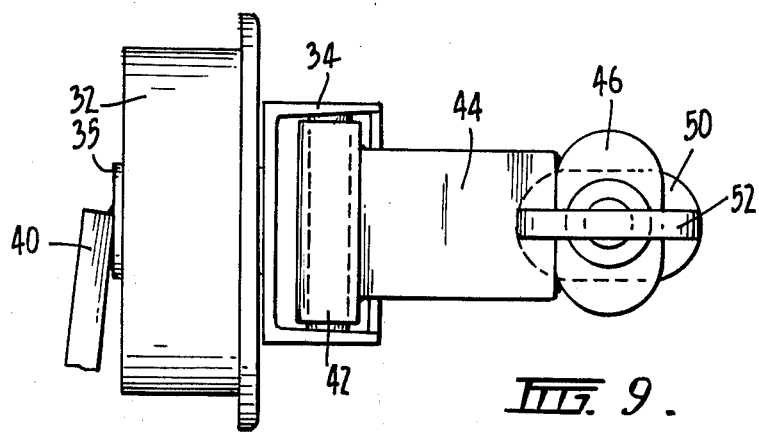

APPARATUS FOR REMOVAL OF CONTAINER CARRIERS

This invention relates to an improved method and apparatus for removal of container carriers from trucks or like transportation means and relates particularly but not exclusively to such for removing container carriers of the type used by organisations to transport goods from one country to another or to transport goods interstate.

When container carriers of the above referred to type are unloaded they are done so whilst on a truck and the truck is often tied up for several hours during this unloading procedure. The present invention proposes to reduce the truck wasted time by providing means whereby the containers can be off-loaded from the truck relatively simply and quickly.

For the purposes of the invention trucks will be taken to mean any movable device which can travel over land and on which container carriers are carried, in particular railway flat-cars.

In accordance with one aspect of the present invention there is provided a method of removing container carriers from trucks, said container carrier having two wheels fitted at least at one end, including the steps of backing the said at least one end of the container carrier on the truck towards ramped container supporting means to cause the said wheels to engage therewith and to ride thereup and to lift the said one end of the container carrier off the truck onto the supporting means, continuing backing the said at least one end of the container carrier to lift the container carrier off the truck onto the supporting means.

Most preferably such method first includes fitting the at least two wheels to the container.

It is further preferred that the method include fitting at least two wheels at each end of the container carrier.

In accordance with another aspect of the present invention there is provided apparatus for assisting the removal of container carriers from trucks comprising wheel means for mounting to container carrier truck mounting means on the container carrier, to enable the container carrier to be removed by the method of the invention, said wheel means including releasable locking means for enabling mounting and demounting of the wheel means to the container carrier.

Preferably, the apparatus of the present invention includes first and second releasable locking means for enabling mounting and demounting of the wheel means to the container carrier. More preferably, the first and second releasable locking means are arranged for mounting to respective adjacent sides of a container carrier.

Also included within the scope of the invention is supporting means onto which a container carrier is to be placed and such includes two parallel horizontally spaced apart rail members with a ramp surface at one end, the spacing apart of the rail members being such as to align with the wheel means referred to above and which are located at each side of the container carrier, said rail members being arranged so that when the above described method is performed the container carrier can be lifted by the ramp surface and transferred onto the supporting means with the tray of the truck passing below the rail members.

In order that the invention can be more fully ascertained the construction of preferred embodiments will now be described with reference to the accompanying drawings wherein:

FIG. 1 is a side view partially in cross section of the wheel means according to one embodiment of the present invention;

FIG. 2 is a rear perspective view of the wheel means of FIG. 1 in a locked position, but wherein the wheel means is not attached to the container carrier;

FIG. 3 is a rear perspective view of the wheel means of FIG. 1 shown in a position where it can be fitted to or removed from the container carrier;

FIG. 4 is a rear perspective view of a truck with a container carrier attached thereto;

FIG. 5 is a close up perspective view of one corner of a container carrier, and showing in dotted lines the wheel means of FIG. 1 fastened to the container carrier truck mounting means;

FIG. 6 is a perspective view of one embodiment of supporting means onto which the container carrier is to be lifted;

FIG. 7 is a perspective view of the wheel means in accordance with another embodiment of the invention;

FIG. 8 is a plan view to an enlarged scale of the wheel means shown in FIG. 7 in mounted condition on a container carrier;

FIG. 9 is a side elevation to an enlarged scale of the wheel means shown in FIG. 7;

FIG. 10 is a schematic plan view of a supporting means of the present invention particularly adapted for use with railway flat-cars.

Referring firstly to FIGS. 1, 2 and 3, the wheel means comprises a wheel 1 rotatably fitted on a locating sleeve member 3 which is, inturn, rotatably fitted onto a locking sleeve member 5. The locking sleeve member 5 has an operating handle 7 welded thereto as shown in FIG. 1. Washers 9 space the wheel member suitably about the locating sleeve member 3 and provide for relatively smooth rotation of the wheel 1. By inspecting FIGS. 2 and 3, it can be seen that the locating sleeve member 3 has a boss member 11 which is of elongated shape with half circular shaped ends. It will also be noted that the locking sleeve member 5 has a boss 13 of substantially identical shape to the boss 11, except that it is marginally thinner.

Referring now to FIG. 4 there is shown a container carrier 15 mounted on a truck 17. It will also be noted by inspecting FIG. 5 that the container truck mounting means 19 are in the form of elongated openings 21 built into the container carrier during construction thereof as in standard shipping containers. As shown each corner post 20 of the container carrier 15 has six of the elongated openings 21. For example, at the lower end of each corner post 20 there are elongated openings 21 in the side, end and underside. The elongated openings 21 on the underside, which cannot be seen in the drawings, are used to secure the container carrier 15 to the truck by a suitable locking device. At the upper end of each corner post 20 there are elongated openings 21 on the side, end and topside. The elongated openings 21 on the topside are used when a crane is employed to load or unload the container carrier in conventional manner.

The wheel means is fastened to the container truck mounting means 19 by first moving the locking sleeve member so that the boss thereof is in the position as shown in FIG. 3, whereupon it can pass through the elongated opening 21 in the side of the container carrier 15. When the operating handle 7 is moved to the position as shown in FIG. 2, the wheel means is held captive onto the container truck mounting means 19. Most preferably the thickness of the boss 11 of the locating sleeve member 3 is equal to the thickness of the material in the container truck mounting means which surrounds the openings 21, but clearly it cannot be any thinner than the thickness of such material otherwise the boss 13 of the locking sleeve member will not be able to be moved to lock the wheel means to the container truck mounting means 19. The wheel means is held in place on the container truck mounting means 19 by the effect of gravity on the operating handle 7 which tends to hold such handle generally vertical and thus the longitudinal axis of boss 13 perpendicular to the longitudinal axis of the opening 21.

Referred now to FIG. 6, there is shown a supporting means 25 with ramp surfaces 27 at one end of rail members 29. The height of the rail members 29 above ground level is arranged to be just higher than the top of the truck. Suitable strut and brace members including cross members 30 provide the necessary support for the rail members 29. The spacing apart of the rail members 29 is equal to the spacing apart of the wheel means, when fitted to the container carrier between each side thereof, and is for the embodiment shown in FIG. 4 marginally bigger than the width of the tray of the truck.

In use, when the container carrier 15 is to be removed from the truck, the truck is backed towards the ramp surfaces 27 to engage the wheel means thereof on the ramp surface. Continued backing of the truck and the container carrier causes the container carrier to ride up the ramp surface and to be lifted onto the rail means 29. Continued backing transfers the container carrier onto the rail members 29 whilst the tray 17 of the truck passes below the cross member 30. Once the container carrier has been transferred onto the supporting means, the truck can then be driven away.

Clearly, the cost of installation of the supporting means 25 and the provision of wheel means for mounting to the container carrier is far less expensive than the cost of providing crane means for removing container carriers from trucks.

It will be realized that by having the supporting means 25 of a suitable length any desired number of container carriers can be fitted thereon. For example, when a second container carrier is to be fitted thereon, the second container carrier is removed in the same manner as described before pushing the first mounted container carrier further down the supporting means.

Further, the supporting means 25 can be a single unit or a number of units can be placed side by side with suitable bracing. Still further, the supporting means 25 can be in the form of a concrete dock or pen made from concrete or other suitable material with the rail members 29 set into the structure during construction.

Also, a transversely movable floor section 31, as shown in FIG. 6, can be installed in front of the entrance to the supporting means 25 to assist in alignment of a truck being backed thereinto. Thus, as the back wheels of the truck move onto the floor section 31, the wheels 1 mounted at the rear of the container carrier 15 approach the ramp 27. If the alignment is not satisfactory the back wheels of the truck can be moved sideways by transverse movement of the floor section 31 until satisfactory alignment is achieved. The process can be repeated for the front wheels of the truck and wheels 1 mounted at the front of the container carrier 15.

The movable floor section 31 preferably comprises a steel plate of suitable thickness mounted on means not shown, such as rollers or other means, allowing it to move transversely of the supporting means 25. The movable floor section 31 has dimensions and location such that it initially supports the two rear wheels of the truck to facilitate alignment of the rearwardly mounted wheels 1. Further, upon continued backing of the truck, the rear wheels thereof preferably leave the floor section 31 when the rearwardly mounted wheels 1 mount the ramp 27. Subsequently, the front wheels of the truck move onto the floor section 31 and the alignment procedure is repeated for the frontally mounted wheels 1.

The inclination of the ramp means may be varied to suit the weight of the container carrier.

Referring now to FIGS. 7, 8 and 9 of the accompanying drawings, the wheel means illustrated therein comprises a wheel 32 rotatably fitted on a tube member 33 which is welded at one end to a bracket 34. At the other end of the tube 33 a locking plate 35 is welded thereto. The locking plate 35 serves to prevent the wheel 32 from coming off the tube 33. A shaft member 36 is rotatably located within the tube member 33. On the side of the bracket remote from the wheel 32 a locating sleeve member 37 is fixedly mounted to the bracket 34. The tube member 33 passes through the wheel 32, the bracket 34 and the locating sleeve member 37. The shaft member 36 passes through the entire length of the tube member 33 and the locking plate 35 and at its end adjacent the bracket 34 terminates in a locking sleeve member 38 fixedly mounted thereon. At its end adjacent the locking plate 35 the shaft 36 has an operating handle 40 welded thereto as can be seen in FIG. 9.

From FIG. 7 it can be seen that the locating sleeve member 37 is in the form of a boss member of elongated shape with half circular shaped ends. It will also be noted that the locking sleeve member 38 is in the form of a boss member of substantially identical shape to the locating sleeve member 37, except that it is marginally thinner.

At one end of the bracket 34, a pivot pin 42 is mounted therewithin in substantially parallel orientation to the wheel 32. A hinge means 44 is pivotally mounted on the pivot pin 42. The hinge means 44 terminates in a second, locating sleeve member 46 which is welded thereto. A shaft 48 is journaled into the locating sleeve member 46 and terminates at one end in a second locking sleeve member 50 and at the other end in a second operating handle 52.

As is described more fully hereinabove, the container truck mounting means of a container carrier are typically in the form of elongated openings built into the container carrier during construction thereof as in standard shipping containers. Each corner post of the container has six of the elongated openings.

The wheel means of FIGS. 7 to 9 is firstly attached to the container truck mounting means 54 (see FIG. 8) in the manner described above, wherein the locking sleeve member 38 and the locating sleeve member 37 are passed into an elongated opening in a side of the container carrier. The locking sleeve member 38 is then partially rotated by the operating handle 40 to hold the wheel means captive onto the container truck mounting means. The effect of gravity on the handle 40 assists in maintaining the wheel means in the captive condition.

Next the hinge means 44 is pivoted on pivot pin 42 so that the locking sleeve member 50 and the locating sleeve member 46 are passed into an elongated opening in a wall of the container carrier adjacent and perpendicular to the side holding captive the wheel means, as shown in FIG. 8. The locking sleeve member 50 is then partially rotated by the operating handle 52 to hold the hinge member 44 against the wall of the container carrier. The use of two locking means gives greater stability to the wheel means which otherwise has a tendency to cant over under the weight of the container carrier.

In use, the container carrier having the wheel means mounted thereon is backed towards a ramped surface as described in detail hereinabove. The container carrier is thereby transferred onto rail members whilst the tray of the truck passes below. Once the container carrier has been transferred onto the supporting means the truck can be driven away. In a particular embodiment of the invention it is envisaged that the supporting means be arranged to receive a plurality of container carriers mounted on railway flat-cars.

The supporting means would be of a length sufficient to allow a plurality of flat-cars on rails to be shunted thereinto. Each container carrier would have a wheel means according to FIG. 1 or FIG. 7 mounted at each corner. As the flat-cars are shunted each container carrier in turn mounts the ramp means and the rail means. Preferably, branches are provided for individual flat-cars. A schematic arrangement of this type is shown in FIG. 10.

In FIG. 10 there is shown a supporting means 56 having a ramp means (not shown) at one end and rail means 58 extending from the ramp means. At spaced intervals there is provided branch rail means 60 from the rail means 58. Each branch rail means 60 terminates in a ramp means (not shown). The space between the rail means 58 and the branch rail means 60 is covered over with a tunnel underneath for access of railway flat-cars in the former case and trucks in the latter case.

In use, as a train of flat-cars is shunted towards the ramp means each container carrier is fitted with wheel means. Thus, the container carriers mount the ramp means in turn and climb onto the rail means 58. Next, each container carrier is shunted into a vacant branch rail means 60 to await collection by a truck. When a truck is to collect such a container carrier it is backed into the tunnel of the respective branch rail means 60. A suitable connection is made with the container carrier and the truck is driven forward such that the container carrier is pulled down the ramp means of the branch rail means 60 onto the truck. The container carrier is securely mounted to the truck in known manner and can then be driven away.

The supporting means described above enables a whole train of container carriers to be unloaded and made ready for dispatch provided the rail means 58 is sufficiently long and there are sufficient available branch lines. When the flat-cars have been unloaded they can then be taken away for loading at another supporting means according to the invention wherein the reverse cycle to that described above is used.

Modifications may be made to the invention as would be apparent to the skilled addressee in the container carrier unloading art. Such modifications are deemed to be within the scope of the present invention. For example, the rail members 58 may be above ground or at ground level as desired. In the latter case the tunnels are cut below ground level to enable the flat-cars to be shunted below the rail members 58.

We claim:

1. An assembly of a container carrier and a plurality of wheel means detachably mounted thereon, said container carrier comprising a generally rectangular container carrier having a top, bottom and sides thereof, a plurality of apertures located proximate each corner of at least two adjacent corners, each plurality of apertures including at least one aperture on each side of said container adjacent said corner, said wheel means comprising a wheel, an axle means for rotatably mounting said wheel, a mounting bracket having a first arm and a second arm, said axle means mounted on said first arm, first mounting and locking means on said first arm for insertably registering with a respective aperture, said first mounting and locking means including first rotatable means for securing said mounting bracket to said container carrier, pivot means for pivotally mounting said second arm to said first arm, second mounting and locking means on said second arm for insertably registering with a respective aperture, said second mounting and locking means including second rotatable means for securing said second arm to said container carrier, whereby said first mounting and locking means can be engaged with an aperture to mount said first arm to said container carrier, said second arm can be pivoted about said pivot means to engage said second mounting and locking means with a respective aperture, whereby said wheel means have improved stability against canting of said wheel under the weight of said container carrier and the contents thereof.

2. Apparatus as claimed in claim 1, wherein the releasable locking means comprises an elongated locking sleeve member arranged to pass through an elongated aperture in the container carrier and to be locked thereinto upon being partially rotated.

3. Apparatus as claimed in claim 2, wherein the releasable locking means comprises an elongated locating member arranged to engage with the elongated aperture in the container carrier when the wheel means is mounted thereto.

4. A detachable wheel and container assembly comprising a generally rectangular container having a plurality of apertures proximate a corner thereof, at least one aperture on each of at least two adjacent sides of the corner, and at least one detachable wheel means to be detachably mounted to a corner of said container by engagement with a plurality of said apertures on adjacent sides of said corner, said wheel means including a plurality of releasable locking means for locking said wheel means into engagement with said plurality of wheel means, said wheel means comprising a bracket having a first arm and a second arm; pivot means for pivotally attaching one arm to the other, a wheel rotatably mounted upon said first arm, first mounting and locking means on said first arm for insertably registering with a respective aperture, said first mounting and locking means including first rotatable means for securing said mounting bracket to said container carrier, second mounting and locking means on said second arm for insertably registering with a respective aperture, said second mounting and locking means including a second rotatable means for securing said second arm to said container carrier on said corner when said first locking means is engaged with a respective aperture and said second arm is pivoted toward another respective aperture, whereby said wheel means have improved stability against canting of said wheel means under the weight of said container carrier and the contents thereof.

5. Apparatus of claim 4, wherein said apertures are elongated apertures in the container carrier, and said locking means comprises an elongated locking sleeve member arranged to pass through said elongated aperture and to be locked thereinto upon being partially rotated.

6. Apparatus of claim 5, wherein the mounting means includes an elongated locating member means for engaging the said elongated aperture in the container carrier when said apparatus is mounted thereto.

* * * * *